United States Patent
Ishiizumi et al.

(10) Patent No.: US 10,183,669 B2
(45) Date of Patent: Jan. 22, 2019

(54) CONTROL APPARATUS FOR VEHICULAR DRIVE UNIT

(71) Applicant: TOYOTA JIDOSHA KABUSHIKI KAISHA, Toyota-shi, Aichi-ken (JP)

(72) Inventors: Kazuya Ishiizumi, Toyota (JP); Tsuyoshi Fujikane, Toyota (JP); Koji Hattori, Toyota (JP); Akira Hino, Toyota (JP); Mitsuhiro Fukao, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 70 days.

(21) Appl. No.: 15/440,432

(22) Filed: Feb. 23, 2017

(65) Prior Publication Data

US 2017/0253247 A1 Sep. 7, 2017

(30) Foreign Application Priority Data

Mar. 2, 2016 (JP) ................................ 2016-040502

(51) Int. Cl.
*B60W 10/02* (2006.01)
*B60W 30/18* (2012.01)
(Continued)

(52) U.S. Cl.
CPC ...... *B60W 30/18172* (2013.01); *B60W 10/02* (2013.01); *B60W 10/107* (2013.01);
(Continued)

(58) Field of Classification Search
CPC ......... B60W 30/18172; B60W 10/107; B60W 10/02; B60W 2710/1005;
(Continued)

(56) References Cited

U.S. PATENT DOCUMENTS

| 6,336,888 B1 | 1/2002 | Eguchi |
| 6,344,014 B1 * | 2/2002 | Eguchi ................... B60K 6/485 |
| | | 477/39 |
| 2002/0028725 A1 | 3/2002 | Totsuka et al. |
| 2012/0053012 A1 | 3/2012 | Yamada et al. |

(Continued)

FOREIGN PATENT DOCUMENTS

| EP | 1070868 A2 | 1/2001 |
| JP | S61-88065 A | 5/1986 |

(Continued)

*Primary Examiner* — Justin Holmes
*Assistant Examiner* — Lillian T Nguyen
(74) *Attorney, Agent, or Firm* — Oliff PLC

(57) ABSTRACT

A control apparatus for a vehicular drive unit is provided. The vehicular drive unit includes a continuously variable transmission, and a clutch. The control apparatus includes an electronic control unit that is configured to acquire an oil temperature of hydraulic oil for controlling the continuously variable transmission and the clutch, and control the clutch such that a torque capacity of the clutch becomes smaller than a torque capacity that is set in a case where an oil temperature of the hydraulic oil is higher than a predetermined oil temperature, when the oil temperature is equal to or lower than the predetermined oil temperature, or control the continuously variable transmission such that a speed ratio of the continuously variable transmission becomes equal to or larger than a lower limit set in advance when the oil temperature of the hydraulic oil is equal to or lower than the predetermined oil temperature.

4 Claims, 10 Drawing Sheets

(51) Int. Cl.
*B60W 10/107* (2012.01)
*F16H 61/662* (2006.01)
*F16H 61/66* (2006.01)
*F16H 59/72* (2006.01)

(52) U.S. Cl.
CPC ............... *F16H 61/66259* (2013.01); *B60W 2510/0291* (2013.01); *B60W 2510/107* (2013.01); *B60W 2520/26* (2013.01); *B60W 2710/027* (2013.01); *B60W 2710/1005* (2013.01); *F16H 59/72* (2013.01); *F16H 2061/6618* (2013.01); *Y10T 477/70* (2015.01)

(58) Field of Classification Search
CPC ... B60W 2510/0291; B60W 2510/107; B60W 2520/26; B60W 2710/027; B60W 2720/26; F16H 61/66259; F16H 59/07; F16H 2061/6618; Y10T 477/70
See application file for complete search history.

(56) References Cited

U.S. PATENT DOCUMENTS

| | | | |
|---|---|---|---|
| 2012/0209495 A1* | 8/2012 | Sakai | B60K 6/485 701/102 |
| 2015/0088391 A1* | 3/2015 | Ishikawa | B60W 10/06 701/54 |
| 2015/0119195 A1* | 4/2015 | Onodera | F02D 29/00 477/38 |

FOREIGN PATENT DOCUMENTS

| | | |
|---|---|---|
| JP | 2001-030801 A | 2/2001 |
| JP | 2001-132828 A | 5/2001 |
| JP | 2001-330134 A | 11/2001 |
| JP | 2002-081530 A | 3/2002 |
| JP | 2004-036848 A | 2/2004 |
| JP | 2004-125040 A | 4/2004 |
| JP | 2012-051468 A | 3/2012 |
| JP | 2012-137123 A | 7/2012 |

* cited by examiner

CONTROL APPARATUS FOR VEHICULAR DRIVE UNIT

INCORPORATION BY REFERENCE

The disclosure of Japanese Patent Application No. 2016-040502 filed on Mar. 2, 2016 including the specification, drawings and abstract is incorporated herein by reference in its entirety.

BACKGROUND

1. Technical Field

The present disclosure relates to a control apparatus for a vehicular drive unit, and more particularly, to the control of a vehicular drive unit that is equipped with a belt-type continuously variable transmission.

2. Description of Related Art

There is known a vehicular drive unit that is equipped with a power source, a continuously variable transmission that is constituted of a pair of pulleys and a belt wound around the pair of the pulleys, and a clutch that is provided in a power transmission path between the continuously variable transmission and a driving wheel. A vehicle described in Japanese Patent Application Publication No. 2012-51468 (JP 2012-51468 A) is such an example. In the vehicle described in Japanese Patent Application Publication No. 2012-51468 (JP 2012-51468 A), with a view to restraining a belt from slipping as a result of the inputting of an excessive torque transmitted from a driving wheel side to a continuously variable transmission, the torque capacity of a clutch is reduced. When the excessive torque is input to the continuously variable transmission from the driving wheel side, the clutch is caused to slip, so the belt is restrained from slipping.

SUMMARY

By the way, when a driver suddenly brakes from a tire slip state, the rotational speed of the driving wheel rapidly falls. At this time, an excessive torque is input to the continuously variable transmission from the driving wheel. On this occasion, the belt may slip. In contrast, it is conceivable to adopt a method of restraining the belt from slipping by reducing the torque capacity of the clutch in advance when a tire slip state is detected, in preparation for subsequent sudden braking by the driver. It should be noted herein that the torque capacity of the clutch needs to be made smaller than the belt torque capacity of the continuously variable transmission in order to restrain the belt from slipping. However, when the oil temperature of hydraulic oil for controlling the continuously variable transmission and the clutch is low, the oil pressure responsiveness deteriorates. Therefore, it takes a long time before the torque capacity of the clutch is made smaller than the belt torque capacity. The torque capacity of the clutch may not be made smaller than the belt torque capacity in time for sudden braking. As a result, it may be impossible to restrain the belt from slipping.

The present disclosure provides a control apparatus that can restrain a belt from slipping even when the oil temperature of hydraulic oil is low, in a vehicular drive unit having a belt-type continuously variable transmission and a clutch that is provided in a power transmission path between the continuously variable transmission and a driving wheel.

A control apparatus for a vehicular drive unit according to one aspect of the present disclosure is provided. The vehicular drive unit includes a power source, a continuously variable transmission, and a clutch. The continuously variable transmission is a belt-type continuously variable transmission. A power of the power source is input to the continuously variable transmission. The clutch is arranged in a power transmission path between the continuously variable transmission and a driving wheel. The control apparatus includes an electronic control unit that is configured to acquire an oil temperature of hydraulic oil for controlling the continuously variable transmission and the clutch, and control the clutch such that a torque capacity of the clutch becomes smaller than a torque capacity that is set in a case where an oil temperature of the hydraulic oil is higher than a predetermined oil temperature, when the oil temperature is equal to or lower than the predetermined oil temperature, or control the continuously variable transmission such that a speed ratio of the continuously variable transmission becomes equal to or larger than a lower limit set in advance when the oil temperature of the hydraulic oil is equal to or lower than the predetermined oil temperature.

With the control apparatus according to this aspect of the present disclosure, when the oil temperature of hydraulic oil is equal to or lower than the predetermined oil temperature, the torque capacity of the clutch is controlled to a value smaller than the torque capacity that is set in the case where the oil temperature of hydraulic oil is higher than the predetermined oil temperature. Thus, when a slip of the driving wheel is detected, the torque capacity of the clutch can be swiftly made smaller than the belt torque capacity of the continuously variable transmission. Alternatively, when the oil temperature of hydraulic oil is equal to the predetermined oil temperature, the speed ratio of the continuously variable transmission is controlled to a value equal to or larger than the lower limit set in advance, so the torque capacity of the clutch becomes small. Therefore, when a slip of the driving wheel is detected, the torque capacity of the clutch can be swiftly made smaller than the belt torque capacity of the continuously variable transmission. As a result, even when an excessive torque is input from the driving wheel side after detection of a slip, the clutch slips, so the belt of the continuously variable transmission can be restrained from slipping.

In the control apparatus according to the aforementioned aspect of the present disclosure, the electronic control unit may be configured to set a command oil pressure of the clutch lower than a command oil pressure that is set in a case where the oil temperature of the hydraulic oil is higher than the predetermined oil temperature, when the oil temperature of the hydraulic oil is equal to or lower than the predetermined oil temperature.

With the control apparatus according to this aspect of the present disclosure, the command oil pressure of the clutch is set lower than the command oil pressure that is set in the case where the oil temperature of hydraulic oil is higher than the predetermined oil temperature. Therefore, the torque capacity of the clutch becomes smaller than the torque capacity at the time when the oil temperature is higher than the predetermined oil temperature. When a slip of the driving wheel is detected, the torque capacity of the clutch can be swiftly made smaller than the belt torque capacity of the continuously variable transmission.

In the control apparatus according to the aforementioned aspect of the present disclosure, the electronic control unit may be configured to control the continuously variable transmission such that a belt torque capacity of the continuously variable transmission becomes larger than in a case where the oil temperature of the hydraulic oil is higher than the predetermined oil temperature, when the oil temperature of the hydraulic oil is equal to or lower than the predetermined oil temperature.

With the control apparatus according to this aspect of the present disclosure, when the oil temperature of hydraulic oil is equal to or lower than the predetermined oil temperature, the belt torque capacity of the continuously variable transmission is controlled to a value larger than in the case where the oil temperature is higher than the predetermined oil temperature. Therefore, when a slip of the driving wheel is detected, the torque capacity of the clutch can be swiftly made smaller than the belt torque capacity of the continuously variable transmission.

In the control apparatus according to the aforementioned aspect of the present disclosure, the electronic control unit may be configured such that a value of the torque capacity of the clutch in a case where the oil temperature of the hydraulic oil is equal to or lower than the predetermined oil temperature is a value that can be made smaller than a belt torque capacity of the continuously variable transmission within a reference response time set in advance from detection of a slip of the driving wheel.

With the control apparatus according to this aspect of the present disclosure, the value of the torque capacity of the clutch that is set in the case where the oil temperature of hydraulic oil is equal to or lower than the predetermined oil temperature is set to a value that can be made smaller than the belt torque capacity of the continuously variable transmission within the reference response time set in advance from detection of a slip of the driving wheel. Therefore, when a slip of the driving wheel is detected, the torque capacity of the clutch can be made smaller than the belt torque capacity within the reference response time.

In the control apparatus according to the aforementioned aspect of the present disclosure, the electronic control unit may be configured to control the continuously variable transmission in such a manner as to make a belt torque capacity of the continuously variable transmission larger than the torque capacity of the clutch when a slip of the driving wheel is detected.

With the control apparatus according to this aspect of the present disclosure, when a slip of the driving wheel is detected, the belt torque capacity of the continuously variable transmission is enhanced to a value larger than the torque capacity of the clutch. Therefore, even when an excessive torque is input from the driving wheel side, the clutch slips, so the belt of the continuously variable transmission is restrained from slipping.

In the control apparatus according to the aforementioned aspect of the present disclosure, the electronic control unit may be configured to control the power source such that a torque of the power source is limited to a torque within such a range as not to cause the clutch to slip at a time of transmission of the torque of the power source to the clutch, when the torque capacity of the clutch becomes smaller than a torque capacity at a time when the oil temperature of the hydraulic oil is higher than the predetermined oil temperature.

With the control apparatus according to this aspect of the present disclosure, while the torque capacity of the clutch is controlled to a value smaller than the torque capacity at the time when the oil temperature of hydraulic oil is higher than the predetermined oil temperature, the torque of the power source is limited to such a range that the clutch does not slip when the torque is transmitted to the clutch. Therefore, the clutch is restrained from slipping when the torque of the power source is transmitted to the clutch.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

The embodiments of the present disclosure will be described hereinafter in detail with reference to the drawings. Incidentally, in the following embodiments of the present disclosure, the drawings are simplified or modified as appropriate, and the dimensional ratios, shapes and the like of respective portions are not necessarily depicted with accuracy.

Figure 1:
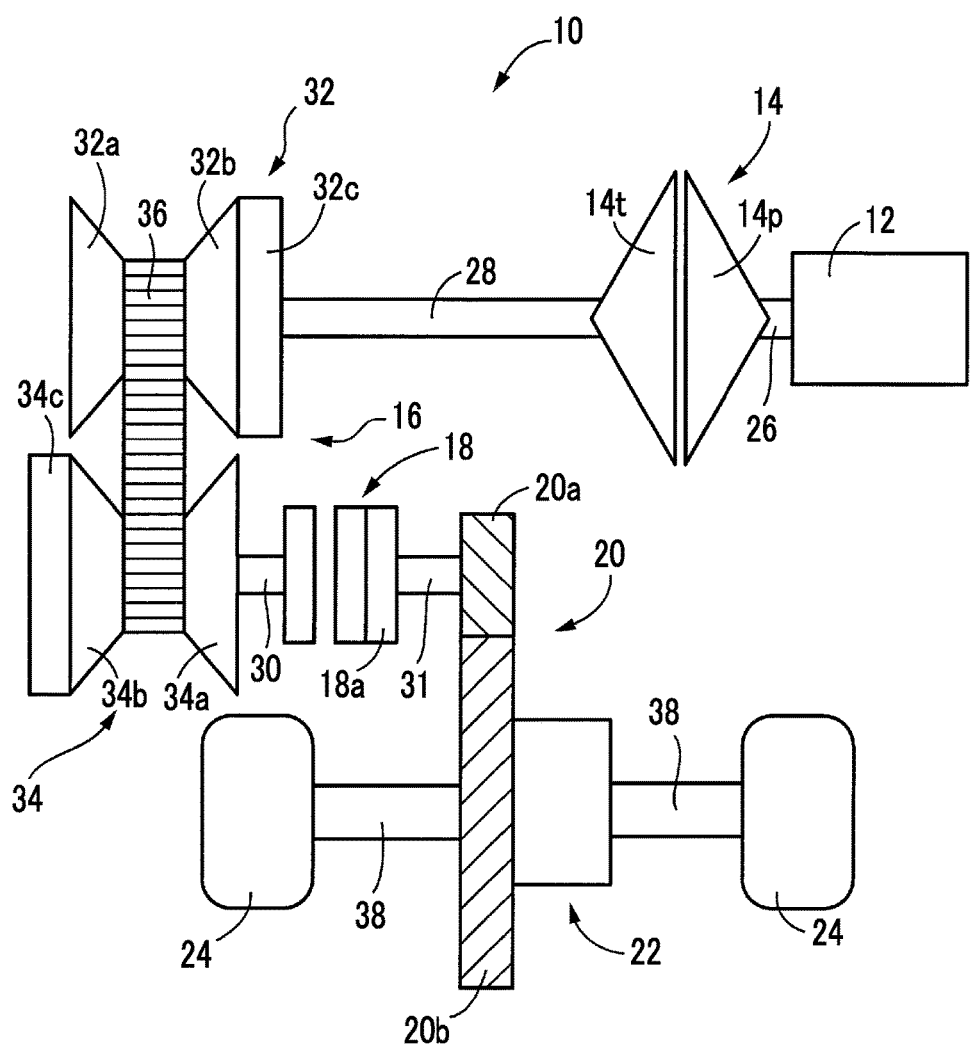
FIG. 1 is a view showing the outline of a vehicular drive unit to which the present disclosure is favorably applied.

FIG. 1 is a view showing the outline of a vehicular drive unit 10 (hereinafter referred to as the drive unit 10) to which the present disclosure is favorably applied. The drive unit 10 is configured to include an engine 12 as a power source, a torque converter 14, a belt-type continuously variable transmission 16, a clutch 18, a pair of reduction gears 20, a differential device 22 and a pair of right and left driving wheels 24.

The engine 12 is configured as an internal combustion engine, for example, a gasoline engine, a diesel engine or the like. The torque converter 14 is equipped with a pump impeller 14p that is coupled to a crankshaft 26 of the engine 12, and a turbine impeller 14*t* corresponding to an output-side member of the torque converter 14, and transmits power via fluid.

The continuously variable transmission 16 is provided in a power transmission path between an input shaft 28 that is coupled to the turbine impeller 14*t* of the torque converter 14 and a first output shaft 30. The continuously variable transmission 16 is equipped with a primary pulley 32 (a variable pulley 32) which is an input-side member coupled to the input shaft 28 and whose effective diameter is variable, a secondary pulley 34 (a variable pulley 34) which is an output-side member and whose effective diameter is variable, and a transmission belt 36 that is wound around the pair of the primary pulley 32 and the secondary pulley 34. Power is transmitted via a frictional force between the pair of the variable pulleys 32 and 34 and the transmission belt 36.

The primary pulley 32 is equipped with a fixed sheave 32*a* as an input-side fixed rotating body, a movable sheave 32*b* as an input-side movable rotating body that is provided relatively unrotatably around an axis of the fixed sheave 32*a* and movably in an axial direction thereof, and a hydraulic cylinder 32*c* that generates a thrust force for moving the movable sheave 32*b* to change the width of a V-shaped groove between the fixed sheave 32*a* and the movable sheave 32*b*.

The secondary pulley 34 is configured to be equipped with a fixed sheave 34*a* as an output-side fixed rotating body, a movable sheave 34*b* as an output-side movable rotating body that is provided relatively unrotatably around an axis of the fixed sheave 34*a* and movably in an axial direction thereof, and a hydraulic cylinder 34*c* that generates a thrust force for moving the movable sheave 34*b* to change the width of a V-shaped groove between the fixed sheave 34*a* and the movable sheave 34*b*.

Due to a change in a hanging diameter (the effective diameter) of the transmission belt 36 resulting from a change in the width of the V-shaped groove of the pair of the variable pulleys 32 and 34, an actual speed ratio (a gear ratio) $\gamma$ (=an input shaft rotational speed/an output shaft rotational speed) is continuously changed. For example, when the V-groove width of the primary pulley 32 is narrowed, the speed ratio $\gamma$ is reduced. That is, the continuously variable transmission 16 is upshifted. Besides, when the width of the V-shaped groove of the primary pulley 32 is widened, the speed ratio $\gamma$ is increased. That is, the continuously variable transmission 16 is downshifted.

The clutch 18 is provided between the first output shaft 30 and a second output shaft 31 that is coupled to a drive gear 20*a* that constitutes the pair of the reduction gears 20. The clutch 18 corresponds to a disconnection/connection device that disconnects/connects the first output shaft 30 and the second output shaft 31 from/to each other, and is a hydraulic frictional engagement device that is frictionally engaged by a hydraulic cylinder 18*a*.

The pair of the reduction gears 20 are configured to be equipped with the drive gear 20*a* and a driven gear 20*b* that also functions as an input rotary member of the differential device 22. The differential device 22 transmits a power input from the driven gear 20*b* to the right and left driving wheels 24 via a pair of right and left wheels 38 while imparting a difference in rotational speed to the pair of the right and left wheels 38 as appropriate. Incidentally, a differential gear in the differential device 22 is configured according to a known art, so detailed description thereof will be omitted.

Figure 2:
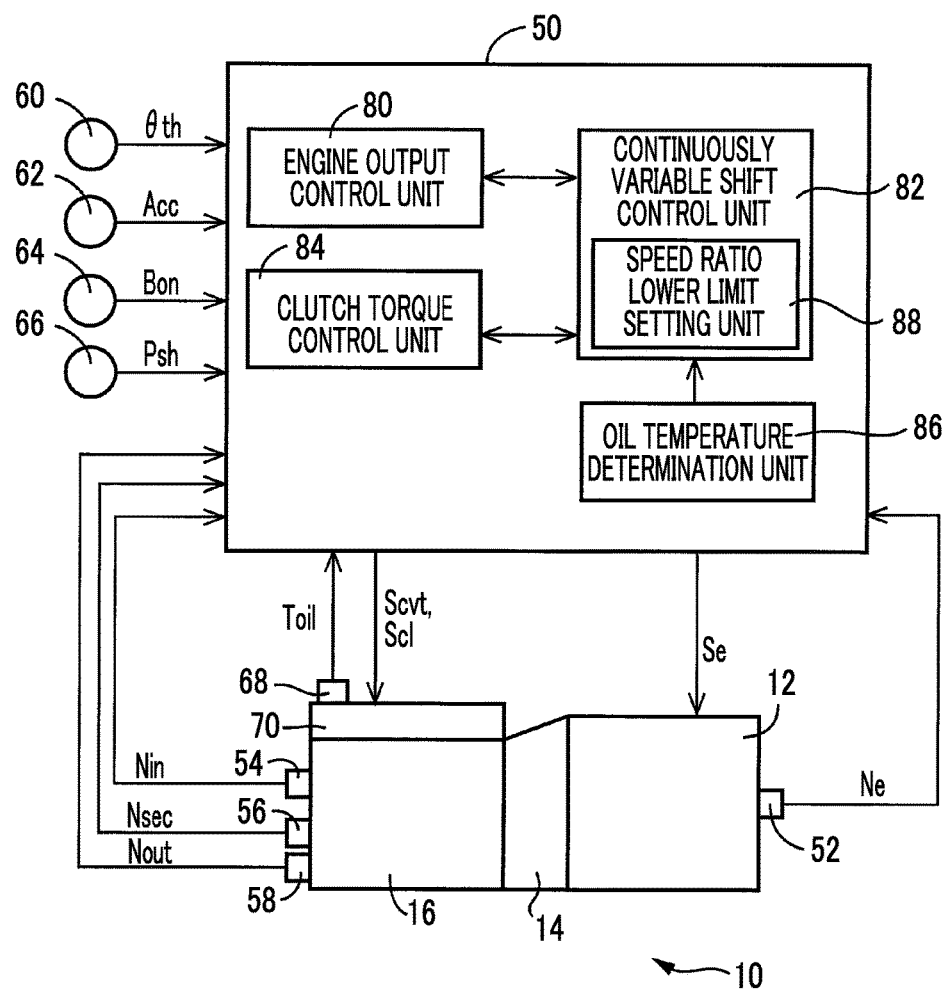
FIG. 2 is a functional block diagram illustrating an input/output system of an electronic control unit that is provided in the drive unit to control an engine, a continuously variable transmission and the like of FIG. 1, and illustrating an essential part of control functions performed by the electronic control unit.

FIG. 2 is a functional block diagram illustrating an input/output system of an electronic control unit 50 that is provided in the drive unit 10 to control the engine 12, the continuously variable transmission 16 and the like, and illustrating an essential part of control functions performed by the electronic control unit 50. The electronic control unit 50 is configured to include a so-called microcomputer that is equipped with, for example, a CPU, a RAM, a ROM, an input/output interface and the like, and performs various kinds of control of the drive unit 10 by performing a signal processing according to a program stored in advance in the ROM while utilizing a temporary storage function of the RAM. For example, the electronic control unit 50 performs output control of the engine 12, shift control and belt clamping force control of the continuously variable transmission 16, torque capacity control of the clutch 18 and the like, and is configured to be divided into an electronic control unit for engine control, an electronic control unit for continuously variable transmission control or the like if necessary.

Signals representing a rotational angle (a position) Acr of the crankshaft and a rotational speed of the engine 12 (an engine rotational speed) Ne as detection results of an engine rotational speed sensor 52, a signal representing an input shaft rotational speed Nin, that is, a rotational speed of the input shaft 28 of the continuously variable transmission 16 as a detection result of an input shaft rotational speed sensor 54, a signal representing a rotational speed Nsec of the secondary pulley 34 of the continuously variable transmission 16 and the first output shaft 30 coupled thereto as a detection result of a first output shaft rotational speed sensor 56, a signal representing a rotational speed Nout of the second output shaft 31 corresponding to a vehicle speed V as a detection result of a second output shaft rotational speed sensor 58, a signal representing a throttle opening degree $\theta$th of an electronic throttle valve as a detection result of a throttle sensor 60, a signal representing an accelerator opening degree Acc, that is, an operation amount of an accelerator pedal as an amount of acceleration requested by a driver as a detection result of an accelerator opening degree sensor 62, a signal representing a brake-on condition Bon indicating a state where a foot brake as a regular brake has been operated as a detection result of a foot brake switch 64, a signal representing a lever position (an operation position) Psh of a shift lever as a detection result of a lever position sensor 66, a signal representing an oil temperature Toil of hydraulic oil for controlling the continuously variable transmission 16 and the clutch 18 as a detection result of an oil temperature sensor 68, and the like are supplied to the electronic control unit 50.

Besides, engine output control command signals Se for output control of the engine 12, oil pressure control command signals Scvt for oil pressure control regarding the shifting of the continuously variable transmission 16, an oil pressure control command signal Scl for adjusting the torque capacity of the clutch 18, and the like are output from the electronic control unit 50. In concrete terms, a throttle signal for controlling the opening/closing of the electronic throttle valve by driving a throttle actuator, an injection signal for controlling the amount of fuel injected from a fuel injection device, an ignition timing signal for controlling the ignition timing of the engine 12 by an ignition device, and the like are output as the aforementioned engine output control command signals Se. Besides, a command signal for driving a linear solenoid valve (not shown) that adjusts a primary pressure Pin that is supplied to the hydraulic cylinder 32*c* constituting the primary pulley 32, a command signal for driving a linear solenoid valve (not shown) that adjusts a secondary pressure Pout that is supplied to the hydraulic cylinder 34*c* constituting the secondary pulley 34, and the like are output to an oil pressure control circuit 70 as the aforementioned oil pressure control command signals Scvt. Furthermore, a command signal for driving a linear solenoid valve that adjusts an oil pressure Pcl that is supplied to the hydraulic cylinder 18a of the clutch 18 is output to the oil pressure control circuit 70 as the oil pressure control command signal Scl.

Next, the control functions of the electronic control unit 50 will be described. An engine output control unit 80 (engine output control means) shown in FIG. 2 outputs the engine output control command signals Se such as the throttle signal, the injection signal, the ignition timing signal and the like to the throttle actuator, the fuel injection device and the ignition device respectively for the sake of, for example, output control of the engine 12. The engine output control unit 80 sets a target engine torque Te* for obtaining a required driving force (a driving torque) that is calculated based on, for example, the accelerator opening degree Acc and the vehicle speed V, and performs opening/closing control of the electronic throttle valve by the throttle actuator such that the target engine torque Te* is obtained. In addition, the engine output control unit 80 controls the fuel injection amount by the fuel injection device, and controls the ignition timing by the ignition device.

A continuously variable shift control unit 82 (continuously variable shift control means) controls the speed ratio γ of the continuously variable transmission 16 such that a target speed ratio γ* that is calculated based on the accelerator opening degree Acc, the vehicle speed V, a brake-on signal Bon and the like is achieved. In concrete terms, the continuously variable shift control unit 82 decides a primary command pressure Pintgt as a command value of the primary pressure Pin (a target primary pressure Pin*) and a secondary command pressure Pouttgt as a command value of the secondary pressure Pout (a target secondary pressure Pout*) in such a manner as to achieve the target speed ratio γ* of the continuously variable transmission 16 at which an operating point of the engine 12 is on an optimal fuel economy line while preventing the belt of the continuously variable transmission 16 from slipping, in other words, such that a target engine rotational speed Ne* at which the operating point of the engine 12 is on the optimal fuel economy line is achieved, and outputs the primary command pressure Pintgt and the secondary command pressure Pouttgt to the oil pressure control circuit 70. Incidentally, the continuously variable shift control unit 82 calculates, as needed, the actual speed ratio γ (=Nin/Nsec) of the continuously variable transmission 16 based on the first output shaft rotational speed Nsec and the input shaft rotational speed Nin.

A clutch torque control unit 84 (clutch torque control means) controls the torque capacity of the clutch 18 that is provided between the first output shaft 30 and the second output shaft 31, in accordance with the running state of the vehicle. At the time of normal running, the clutch torque control unit performs control such that a torque transmitted from the continuously variable transmission 16 is transmitted to the driving wheels 24 without being lost, namely, that a torque capacity Tcl of the clutch 18 becomes larger than a transmissible belt torque capacity Tcvt of the continuously variable transmission 16. Incidentally, the belt torque capacity Tcvt of the continuously variable transmission 16 is calculated based on a relationship determined in advance, from an oil pressure Pin of the hydraulic cylinder 32c of the primary pulley 32 and an oil pressure of the hydraulic cylinder 34c of the secondary pulley 34. Besides, the torque capacity Tcl of the clutch 18 is calculated based on the oil pressure Pcl of the hydraulic cylinder 18a of the clutch 18.

Besides, when the rotational speed of the driving wheels 24 rapidly falls due to sudden braking by the driver, a change in a friction coefficient μ of a road surface or the like with the driving wheels 24 (tires) slipping, an inertia torque resulting from a change in rotational speed is input to the continuously variable transmission 16 from the driving wheel sides. This inertia torque may cause a belt of the continuously variable transmission 16 to slip. Thus, upon detecting a slip of the driving wheels 24, the clutch torque control unit 84 reduces the torque capacity Tcl of the clutch 18 that is provided in the power transmission path between the continuously variable transmission 16 and the driving wheels 24, to a value that is set in advance smaller than the belt torque capacity Tcvt of the continuously variable transmission 16. Incidentally, when the amount of change in each of the engine rotational speed Ne, the input shaft rotational speed Nin, the rotational speed Nsec of the first output shaft 30 and the rotational speed Nout of the second output shaft 31 per unit time exceeds a prescribed value set in advance, it is determined that the driving wheels 24 have slipped.

In conjunction with the control by the aforementioned clutch torque control unit 84, upon detecting a slip of the driving wheels 24, the continuously variable shift control unit 82 increases the belt torque capacity Tcvt of the continuously variable transmission 16 to a value that is set in advance larger than the torque capacity Tcl of the clutch 18. Due to the performance of this control, the torque capacity Tcl of the clutch 18 becomes smaller than the belt torque capacity Tcvt of the continuously variable transmission 16. Therefore, even when an inertia torque is transmitted from the driving wheel sides, the clutch 18 slips to restrain the belt of the continuously variable transmission 16 from slipping and protect the transmission belt 36.

It should be noted herein that when a slip is detected, the torque capacity Tcl of the clutch 18 is desired to be swiftly made smaller than the belt torque capacity Tcvt of the continuously variable transmission 16 (Tcl<Tcvt). Thus, a reference response time trep as a permissible time for making the torque capacity Tcl of the clutch 18 smaller than the belt torque capacity Tcvt of the continuously variable transmission is set in advance with respect to a time point when a slip is detected. The torque capacity Tcl of the clutch 18 is so controlled as to become smaller than the belt torque capacity Tcvt of the continuously variable transmission 16 within this reference response time trep. Incidentally, the reference response time trep is a value that is obtained in advance experimentally, and is set to a time (e.g., about 0.2 sec) shorter than a period from the occurrence of a slip to the inputting of an inertia torque.

By the way, the responsiveness of the torque capacity Tcl of the clutch 18 changes in accordance with the oil pressure responsiveness of the hydraulic cylinder 18a of the clutch 18, and the responsiveness of the belt torque capacity Tcvt of the continuously variable transmission 16 changes in accordance with the oil pressure responsiveness of the hydraulic cylinders 32c and 34c of the continuously variable transmission 16. For example, when the oil temperature Toil of the hydraulic oil in the oil pressure control circuit 70 becomes low, both the responsiveness of the torque capacity Tcl of the clutch 18 and the responsiveness of the belt torque capacity Tcvt of the continuously variable transmission 16 deteriorate as the viscosity of the hydraulic oil increases.

Figure 3:
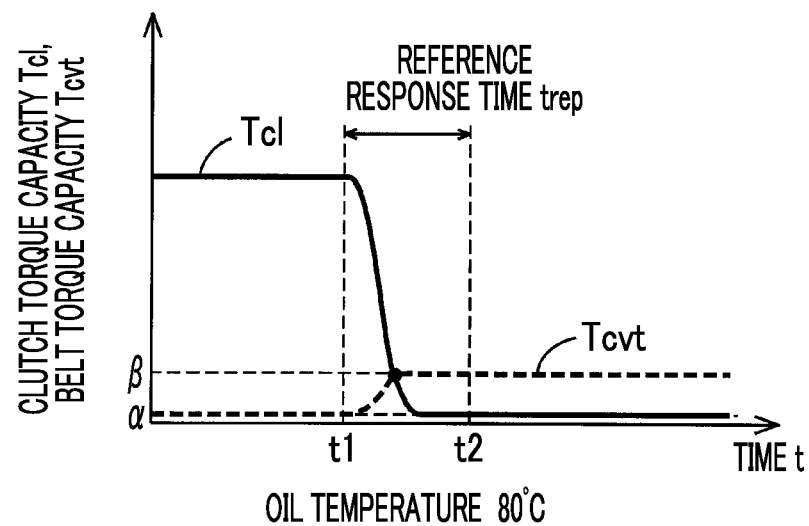
FIG. 3 is a view showing the responsiveness of a torque capacity of a clutch and a belt torque capacity of the continuously variable transmission to an oil temperature.
Figure 3:
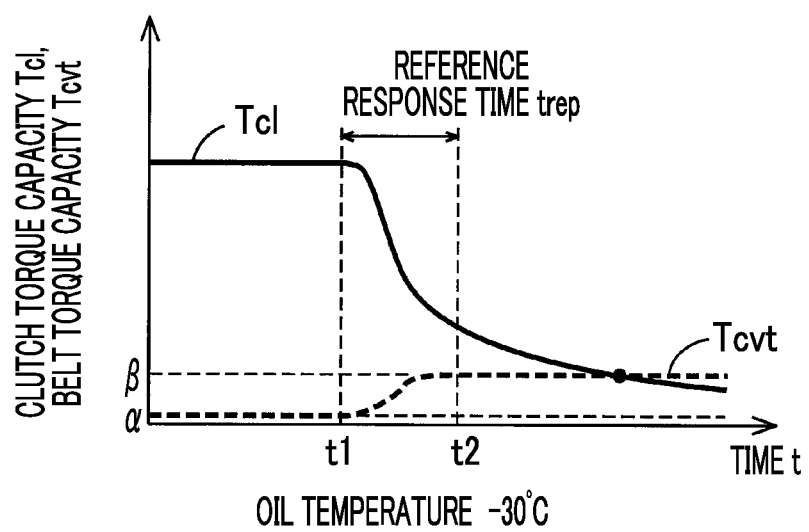

FIG. 3 shows the responsiveness of the torque capacity Tcl of the clutch 18 and the belt torque capacity Tcvt of the continuously variable transmission 16 to the oil temperature Toil. FIG. 3 shows the responsiveness at the time when the oil temperature Toil of hydraulic oil is equal to 80° C., and the responsiveness at the time when the oil temperature Toil of hydraulic oil is equal to −30° C. Other conditions including the speed ratio γ are the same. FIG. 3 shows a case where a predetermined value α is output as a command value of the torque capacity Tcl of the clutch 18 and a predetermined value β is output as a command value of the belt torque capacity Tcvt of the continuously variable transmission 16 at a time point t1.

When the oil temperature Toil of hydraulic oil is equal to 80° C., the torque capacity Tcl of the clutch 18 and the belt torque capacity Tcvt of the continuously variable transmission 16 swiftly change from the time point t1 as a result of low viscosity of hydraulic oil and high responsiveness of oil pressure. Then, the torque capacity Tcl becomes smaller than the belt torque capacity Tcvt within the reference response time trep that is set in advance with respect to the time point t1. Accordingly, when a slip is detected, for example, at the time point t1 and the torque capacity Tcl is so controlled as to become smaller than the belt torque capacity Tcvt, the torque capacity Tcl becomes smaller than the belt torque capacity Tcvt within the reference response time trep. Therefore, the belt can be restrained from slipping after the occurrence of a slip.

On the other hand, when the oil temperature Toil of hydraulic oil is equal to −30° C., the torque capacity Tcl of the clutch 18 and the belt torque capacity Tcvt of the continuously variable transmission 16 gently change at and after the time point t1 as a result of high viscosity of hydraulic oil and low responsiveness of oil pressure. Thus, at a time point t2 after the lapse of the reference response time trep from the time point t1 as well, the torque capacity Tcl does not become smaller than the belt torque capacity Tcvt. Accordingly, even when a slip is detected, for example, at the time point t1 and the torque capacity Tcl is so controlled as to become smaller than the belt torque capacity Tcvt, the torque capacity Tcl does not become smaller than the belt torque capacity Tcvt within the reference response time trep. Thus, a slip of the belt may occur due to an inertia torque that is input at and after the time point t2.

As described above, the responsiveness of the torque capacity Tcl of the clutch 18 and the responsiveness of the belt torque capacity Tcvt of the continuously variable transmission 16 change in accordance with the oil temperature Toil of hydraulic oil. Therefore, the time required to make the torque capacity Tcl smaller than the belt torque capacity Tcvt after the occurrence of a slip may exceed the reference response time trep. Thus, the torque capacity Tcl of the clutch 18 can be made smaller than the belt torque capacity Tcv of the continuously variable transmission 16 until the lapse of the reference response time trep after the occurrence of a slip, by performing the control to be described below in accordance with the oil temperature Toil of hydraulic oil. The control that makes the foregoing possible will be described hereinafter.

Returning to FIG. 2, an oil temperature determination unit 86 (oil temperature determination means) determines whether or not the oil temperature Toil of hydraulic oil detected by the oil temperature sensor 68 has become equal to or lower than a predetermined oil temperature Tα set in advance. The predetermined oil temperature Tα is a value that is obtained in advance through an experiment or an analysis, and is set to a threshold of the oil temperature Toil that can make the torque capacity Tcl smaller than the belt torque capacity Tcvt within the reference response time trep, or to the vicinity of the threshold. When the oil temperature Toil is higher than the predetermined oil temperature Tα, the control of making the torque capacity Tcl smaller than the belt torque capacity Tcvt within the reference response time trep (hereinafter referred to as low oil temperature belt slip restraint control) is not performed even in a low oil temperature state that will be described later. On the other hand, when the oil temperature Toil is equal to or lower than the predetermined oil temperature Tα, low oil temperature belt slip restraint control is performed. That is, the oil temperature determination unit 86 has the function of determining whether to perform low oil temperature belt slip restrain control or not.

A speed ratio lower limit setting unit 88 (speed ratio lower limit setting means) executes a setting for speed ratio lower limit when the oil temperature determination unit 86 determines that the oil temperature Toil is equal to or lower than the predetermined oil temperature Tα. The speed ratio lower limit setting unit 88 sets a lower limit γlow of the speed ratio γ of the continuously variable transmission 16. When the speed ratio lower limit setting unit 88 sets the lower limit γlow of the speed ratio γ of the continuously variable transmission 16, the continuously variable shift control unit 82 performs control such that the speed ratio γ of the continuously variable transmission 16 becomes equal to or larger than the lower limit γlow.

For example, when the speed ratio lower limit setting unit 88 sets the lower limit γlow of the speed ratio γ, the continuously variable shift control unit 82 sets the target speed ratio γ*, which is calculated based on the accelerator opening degree Acc, the vehicle speed V or the like, to the lower limit γlow as soon as the target speed ratio γ* becomes smaller than the lower limit γlow. Incidentally, when the calculated target speed ratio γ* is equal to or larger than the lower limit γlow, the continuously variable shift control unit 82 performs control such that the speed ratio γ becomes equal to the calculated target speed ratio γ*.

Figure 4:
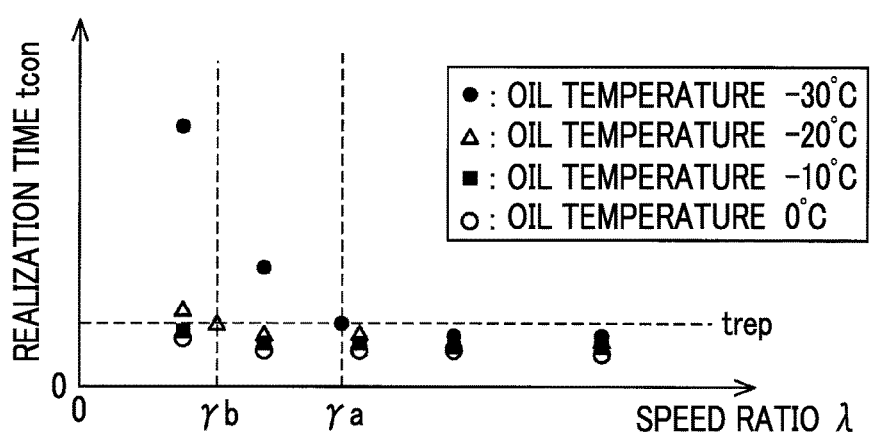
FIG. 4 is a view showing a relationship between a speed ratio and a realization time that is needed to realize a state where the torque capacity of the clutch is smaller than the belt torque capacity.

The lower limit γlow is obtained in advance experimentally or analytically. In concrete terms, the lower limit γlow is set to a value that can make the torque capacity Tcl of the clutch 18 smaller than the belt torque capacity Tcvt of the continuously variable transmission 16 within the reference response time trep. FIG. 4 shows a relationship between the speed ratio γ and a realization time tcon required to make the torque capacity Tcl smaller than the belt torque capacity Tcvt at each of oil temperatures (−30° C., −20° C., −10° C. and 0° C.). Incidentally, FIG. 4 is obtained based on an experiment.

In FIG. 4, the axis of abscissa represents the speed ratio γ of the continuously variable transmission 16 during running, and the axis of ordinate represents the realization time tcon that is required to make the torque capacity Tcl of the clutch 18 smaller than the belt torque capacity Tcvt. Besides, in the drawing, "each black circle" indicates a case where the oil temperature of hydraulic oil is equal to −30° C., "each blank triangle" indicates a case where the oil temperature Toil is equal to −20° C., "each black square" indicates a case where the oil temperature Toil is equal to −10° C., and "each blank circle" indicates a case where the oil temperature Toil is equal to 0° C.

As shown in FIG. 4, the realization time tcon shortens as the speed ratio γ increases. That is, the swiftness with which the torque capacity Tcl can be made smaller than the belt torque capacity Tcvt increases as the speed ratio γ increases. This is because of the following reason. The torque capacity Tcl (a one-axis equivalent value) that is converted in the case where the clutch 18 is arranged concentrically with the engine 12 (on the input shaft 28) decreases as the speed ratio γ increases. Thus, even when the amount of change (the amount of decrease) of the hydraulic cylinder 18a of the clutch 18 is small, the torque capacity Tcl can be made smaller than the belt torque capacity Tcvt. That is, even when the oil pressure Pcl of the hydraulic cylinder 18a of the clutch 18 remains the same, the torque capacity Tcl (the one-axis equivalent value) that is converted in the case where the clutch 18 is arranged concentrically with the engine 12 decreases as the speed ratio γ of the continuously variable transmission 16 increases. Therefore, the torque capacity Tcl can be swiftly made smaller than the belt torque capacity Tcvt.

Besides, the realization time tcon lengthens as the oil temperature Toil falls. For example, if a comparison is made at the same speed ratio γ, the realization time tcon is the longest in the case where the oil temperature Toil is equal to −30° C. as shown in FIG. 4. Then, the realization time tcon shortens as the oil temperature shifts from −20° C. to −10° C. and then to 0° C.

The case where the oil temperature Toil is equal to −30° C. will be described. In a region where the speed ratio γ is smaller than a predetermined value γa, the realization time tcon is longer than the foregoing reference response time trep. When the speed ratio γ reaches the predetermined value γa, the realization time tcon becomes equal to the reference response time trep. Accordingly, in the region where the speed ratio γ is smaller than the predetermined value γa, it is difficult to make the torque capacity Tcl smaller than the belt torque capacity Tcvt within the reference response time trep. However, when the speed ratio becomes equal to or larger than the predetermined value γa, the torque capacity Tcl can be made smaller than the belt torque capacity Tcvt within the reference response time trep.

In the case where the oil temperature Toil is equal to −20° C., in a region where the speed ratio γ is smaller than a predetermined value γb, the realization time tcon is longer than the reference response time trep. When the speed ratio γ reaches the predetermined value γb, the realization time tcon becomes equal to the reference response time trep. Accordingly, in the region where the speed ratio γ is smaller than the predetermined value γb, it is difficult to make the torque capacity Tcl smaller than the belt torque capacity Tcvt within the reference response time trep. However, when the speed ratio becomes equal to or larger than the predetermined value γb, the torque capacity Tcl can be made smaller than the belt torque capacity Tcvt within the reference response time trep.

Besides, in the case where the oil temperature Toil is equal to −10° C. or 0° C., regardless of the value of the speed ratio γ, the realization time tcon is shorter than the reference response time trep. Thus, in the case where the oil temperature Toil is equal to −30° C., the lower limit γlow of the speed ratio γ is set to the predetermined value γa, so the torque capacity Tcl can be made smaller than the belt torque capacity Tcvt within the reference response time trep. Besides, in the case where the oil temperature Toil is equal to −20° C., the lower limit γlow of the speed ratio γ is set to the predetermined value γb, so the torque capacity Tcl can be made smaller than the belt torque capacity Tcvt within the reference response time trep. Besides, in the case where the oil temperature Toil is equal to −10° C. or 0° C., the torque capacity Tcl can be made smaller than the belt torque capacity Tcvt within the reference response time trep, without setting the lower limit γlow of the speed ratio γ. In this regard, the predetermined oil temperature Tα is set as the oil temperature Toil between −20° C. and −10° C.

As described above, the lower limit γlow that can make the torque capacity Tcl smaller than the belt torque capacity Tcvt within the reference response time trep is obtained in advance at each oil temperature Toil of hydraulic oil, and is stored as a relational map. The speed ratio lower limit setting unit 88 sets the lower limit γlow by referring to the current oil temperature Toil, based on the relational map constituted of the oil temperature Toil and the lower limit γlow. By controlling the set lower limit γlow as the lower limit of the speed ratio γ, the continuously variable shift control unit 82 can make the torque capacity Tcl of the clutch 18 smaller than the belt torque capacity Tcvt of the continuously variable transmission 16 after a slip of the driving wheels 24 is detected, even when the oil temperature Toil is low.

Figure 5:
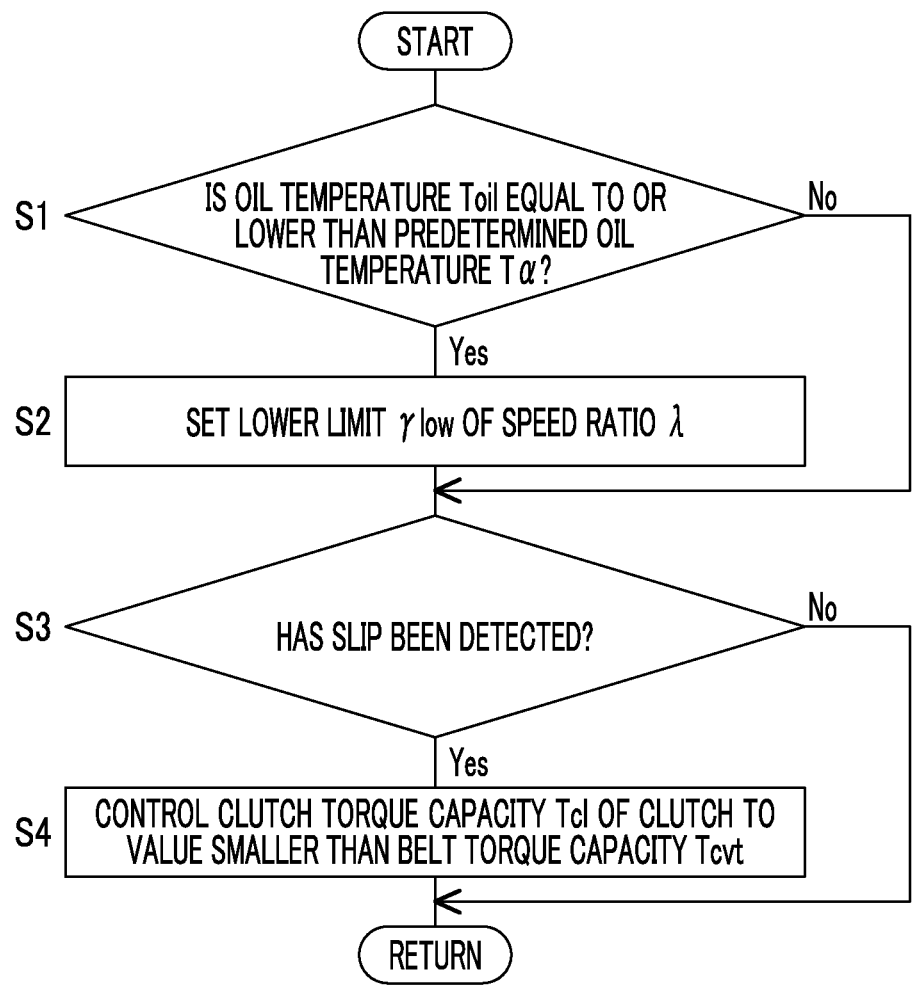
FIG. 5 is a flowchart illustrating a control operation that is performed by the electronic control unit of FIG. 2 to make it possible to restrain a belt of the continuously variable transmission from slipping even when an inertia torque is input from driving wheels due to a slip of a vehicle.

FIG. 5 is a flowchart illustrating a control operation that is performed by the electronic control unit 50 to make it possible to restrain the belt of the continuously variable transmission 16 from slipping even when an inertia torque is input from the driving wheels 24 due to a slip of the vehicle. This flowchart is repeatedly executed during the running of the vehicle.

First of all, in step S1 (the word "step" will be omitted hereinafter) corresponding to the function of the oil temperature determination unit 86, it is determined whether or not the oil temperature Toil of hydraulic oil is equal to or lower than the predetermined oil temperature Tα. If the oil temperature Toil is higher than the predetermined oil temperature Tα, the result of the determination in S1 is regarded as negative, and a transition to step 3, which will be described later, is made. If the oil temperature Toil is equal to or lower than the predetermined oil temperature Tα, the result of the determination in S1 is regarded as positive, and a transition to S2 is made. In S2 corresponding to the speed ratio lower limit setting unit 88, the lower limit γlow of the speed ratio γ of the continuously variable transmission 16 is set based on the oil temperature Toil.

Subsequently in S3 corresponding to the clutch torque control unit 84, it is determined whether or not a slip of the driving wheels 24 has been detected. If no slip has been detected, the result of the determination in S3 is regarded as negative, and the present routine is ended. If a slip has been detected, the result of the determination in S3 is regarded as positive, and a transition to S4 is made. In S4 corresponding to the continuously variable shift control unit 82 and the clutch torque control unit 84, the torque capacity Tcl of the clutch 18 is controlled to a value smaller than the belt torque capacity Tcvt of the continuously variable transmission 16.

It should be noted herein that when the oil temperature Toil is equal to the predetermined oil temperature Tα, the speed ratio γ of the continuously variable transmission 16 is controlled in advance to a value larger than the lower limit γlow. Therefore, when a slip is detected, the torque capacity Tc of the clutch 18 becomes smaller than the belt torque capacity Tcvt within the reference response time trep. Accordingly, even when an inertia torque is input to the continuously variable transmission 16 due to sudden braking after the occurrence of a slip, the clutch 18 slips, so the belt of the continuously variable transmission 16 is restrained from slipping.

Figure 6:
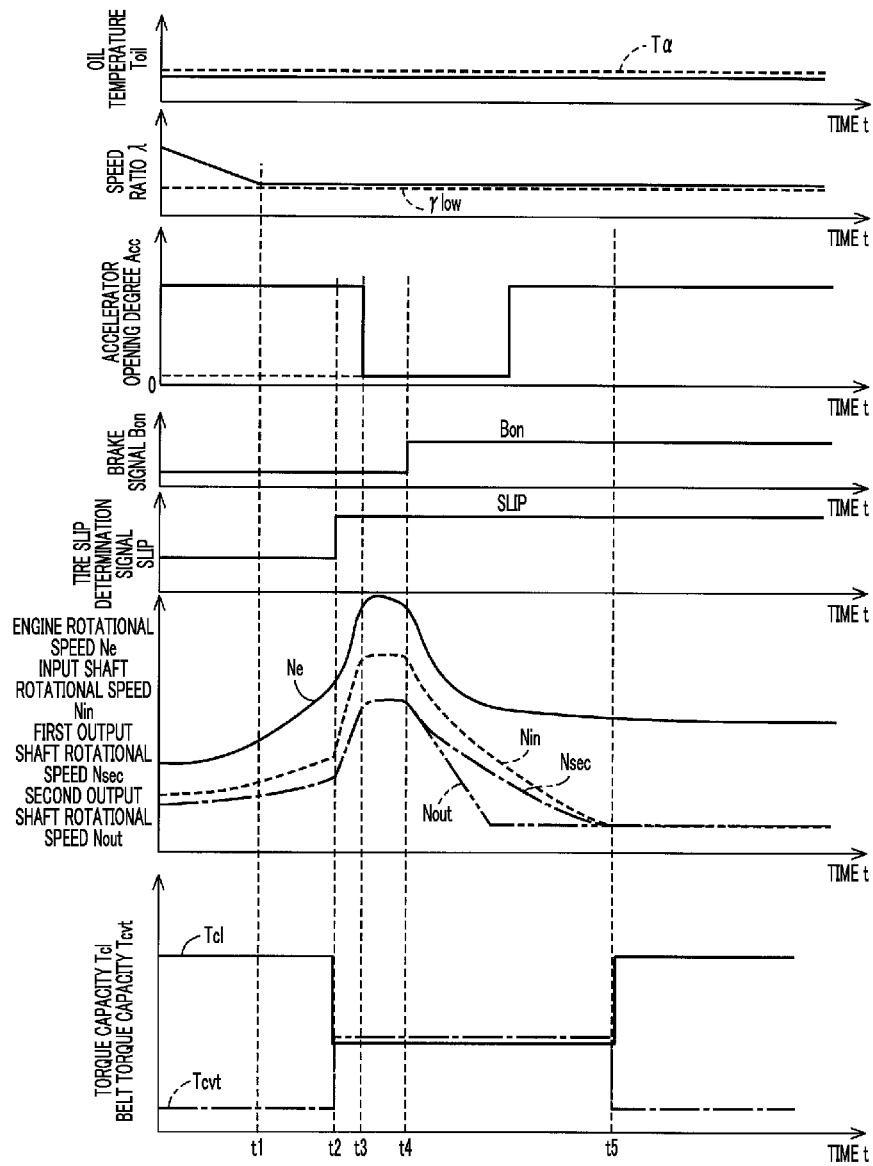
FIG. 6 is a time chart showing an operation result based on the flowchart of FIG. 5.

FIG. 6 is a time chart showing an operation result through the control operation of the electronic control unit 50. FIG. 6 shows the control operation while running with the oil temperature Toil of hydraulic oil being lower than the predetermined oil temperature Tα. In FIG. 6, the axis of abscissa represents an elapsed time t, and the axes of ordinate represent, sequentially from above, the oil temperature Toil, the speed ratio γ of the continuously variable transmission 16, the accelerator opening degree Acc, the brake signal Bon, a tire slip determination signal SLIP, the various rotational speeds (the engine rotational speed Ne, the input shaft rotational speed Nin, the first output shaft rotational speed Nsec and the second output shaft rotational speed Nout) and the various torque capacities (the torque capacity Tcl and the belt torque capacity Tcvt) respectively.

As shown in FIG. 6, the oil temperature Toil of hydraulic oil is lower than the predetermined oil temperature Tα. Accordingly, the lower limit γlow of the speed ratio γ is set. The speed ratio γ changes toward a high gear side (in such a direction that the speed ratio decreases) at and before the time point t1. When the speed ratio γ decreases to the lower limit γlow at the time point t1, the speed ratio γ is thereafter held equal to the lower limit γlow.

When a slip is detected at the time point t2, the torque capacity Tcl of the clutch 18 indicated by a solid line is lowered to a predetermined value set in advance. In parallel, the belt torque capacity Tcvt of the continuously variable transmission 16 indicated by an alternate long and short dash line is enhanced to a predetermined value that is set in advance larger than the torque capacity Tcl of the clutch 18. Incidentally, both the torque capacity Tcl and the belt torque capacity Tcvt, which are shown in FIG. 6, are command values. The actual torque capacity Tcl decreases with delay, and the actual belt torque capacity Tcvt increases with delay.

Depression of the accelerator pedal by the driver is canceled at a time point t3, and the driver depresses a foot brake pedal at a time point t4, so an inertia torque resulting from a change in the rotational speed of the driving wheels 24 is input from the driving wheel 24 sides. It should be noted herein that the actual torque capacity Tcl becomes smaller than the belt torque capacity Tcvt within the reference response time trep set in advance from the time point t2. Therefore, the torque capacity Tcl is already smaller than the belt torque capacity Tcvt at the time point t4. Accordingly, even when an inertia torque is input at the time point t4, the clutch 18 slips, so the belt of the continuously variable transmission 16 is restrained from slipping.

Incidentally, the reference response time Trep is not mentioned in FIG. 6, but is set sufficiently shorter than a period between the time point t2 and the time point t4. Besides, when the lower limit γlow of the speed ratio γ is not set, the torque capacity Tc (the one-axis equivalent value) of the clutch 18 is large. Therefore, the actual torque capacity Tc becomes smaller than the actual belt torque capacity Tcvt at and after, for example, the time point t4. A slip of the belt may be caused by the inertia torque that is input at the time point t4.

As described above, according to the present embodiment of the present disclosure, when the oil temperature Toil of hydraulic oil is equal to the predetermined oil temperature Tα, the speed ratio γ of the continuously variable transmission 16 is controlled to a value larger than the lower limit γlow set in advance, so the torque capacity Tcl (the one-axis equivalent value) of the clutch 18 becomes small. Therefore, when a slip of the driving wheels 24 is detected, the torque capacity Tcl of the clutch 18 can be swiftly made smaller than the belt torque capacity Tcvt of the continuously variable transmission 16. As a result, even when an excessive inertia torque is input from the driving wheel 24 sides after detection of a slip, the clutch 18 slips, so the belt of the continuously variable transmission 16 can be restrained from slipping.

Besides, according to the present embodiment of the present disclosure, when a slip of the driving wheels 24 is detected, the belt torque capacity Tcvt of the continuously variable transmission 16 is enhanced to a value larger than the torque capacity Tcl of the clutch 18. Therefore, even when an excessive inertia torque is input from the driving wheel sides, the clutch 18 slips, so the belt of the continuously variable transmission 16 is restrained from slipping.

Next, the other embodiment of the present disclosure will be described. Incidentally, components common to those of the foregoing embodiment of the present disclosure will be denoted by the same reference symbols respectively in the following description. The description of those components will be omitted.

Figure 7:
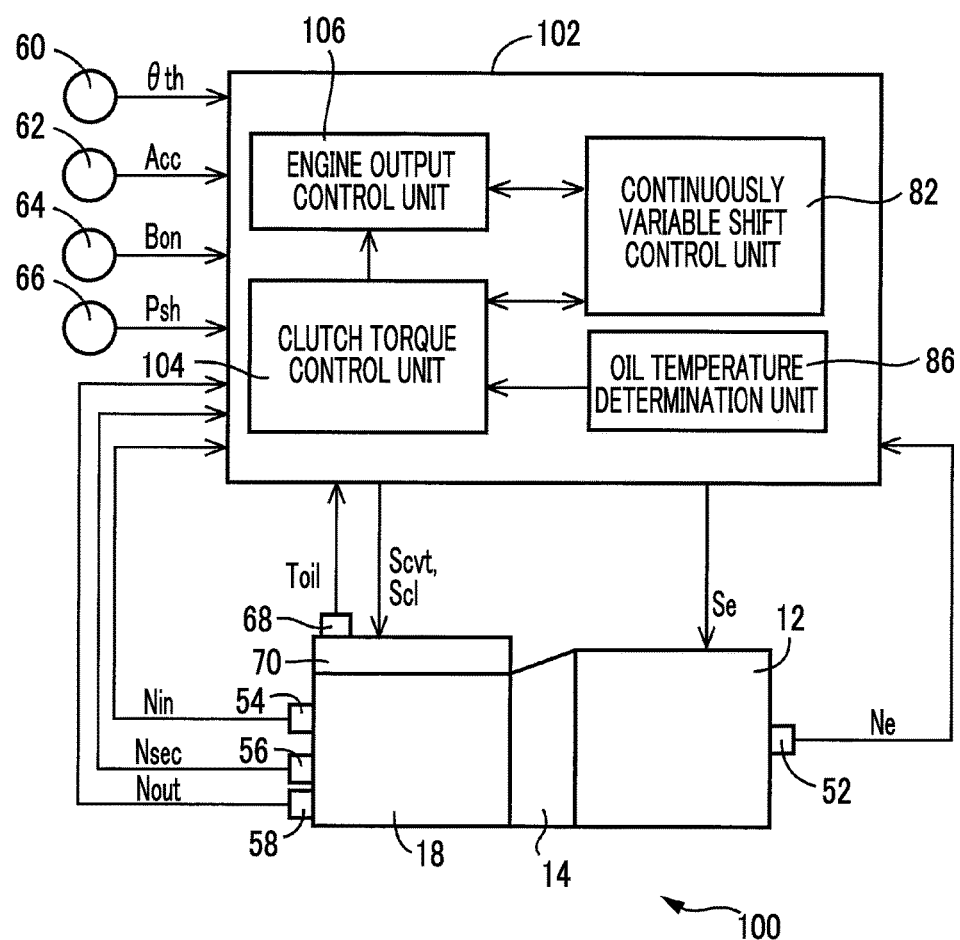
FIG. 7 is a functional block diagram illustrating an essential part of control functions performed by an electronic control unit that controls a vehicular drive unit corresponding to the other embodiment of the present disclosure.

FIG. 7 is a functional block diagram illustrating an essential part of control functions performed by an electronic control unit 102 that controls a vehicular drive unit 100 corresponding to the other embodiment of the present disclosure. When the oil temperature determination unit 86 determines that the oil temperature Toil of hydraulic oil has become equal to or lower than the predetermined oil temperature Tα set in advance, a clutch torque control unit 104 controls the oil pressure Pcl (the command oil pressure) of the hydraulic cylinder 18a of the clutch 18 to a constant pressure Pcon set in advance.

The constant pressure Pcon is a value that is obtained in advance through an experiment or an analysis, and is set within a range that can make the torque capacity Tcl of the clutch 18 smaller than the belt torque capacity Tcvt of the continuously variable transmission 16 within the reference response time trep with respect to a time point when a slip is detected. For example, a relational map constituted of the oil temperature Toil and the constant pressure Pcon is obtained in advance and stored. The constant pressure Pcon is a value lower than a command oil pressure that is set when the oil temperature Toil is higher than the predetermined oil temperature Tα, and is set to a value that falls as the oil temperature Toil falls. Accordingly, when the oil temperature Toil is equal to or lower than the predetermined oil temperature Tα, the torque capacity Tcl of the clutch 18 that is proportional to the oil pressure Pcl of the hydraulic cylinder 18a of the clutch 18 is controlled to a value smaller than the torque capacity Tcl at the time when the oil temperature Toil is higher than the predetermined oil temperature Tα.

The clutch torque control unit 104 decides the constant pressure Pcon by referring to the current oil temperature Toil, based on the relational map constituted of the oil temperature Toil and the constant pressure Pcon, and outputs the decided constant pressure Pcon as a command oil pressure of the hydraulic cylinder 18a of the clutch 18. Accordingly, the oil pressure Pcl of the hydraulic cylinder 18a of the clutch 18 is controlled to the constant pressure Pcon.

Besides, while the oil pressure Pcl of the hydraulic cylinder 18a of the clutch 18 is controlled to the constant pressure Pcon, an engine output control unit 106 sets an upper limit Telim of the target engine torque Te*. The upper limit Telim is set within such a range that the clutch 18 does not slip when the engine torque Te is transmitted to the clutch 18. In concrete terms, the upper limit Telim is set smaller than the equivalent value (the one-axis equivalent value) of the torque capacity Tcl of the clutch 18 at the time when the clutch 18 is arranged concentrically with the engine 12. Incidentally, the torque capacity of the clutch 18 at this time is a value that is calculated based on the constant pressure Pcon as a command oil pressure of the hydraulic cylinder 18a of the clutch 18. The engine output control unit 106 sets the upper limit Telim as an upper limit of the target engine torque Te* and controls the engine torque Te within a range below the upper limit Telim, so the clutch 18 is restrained from slipping during running.

Figure 8:
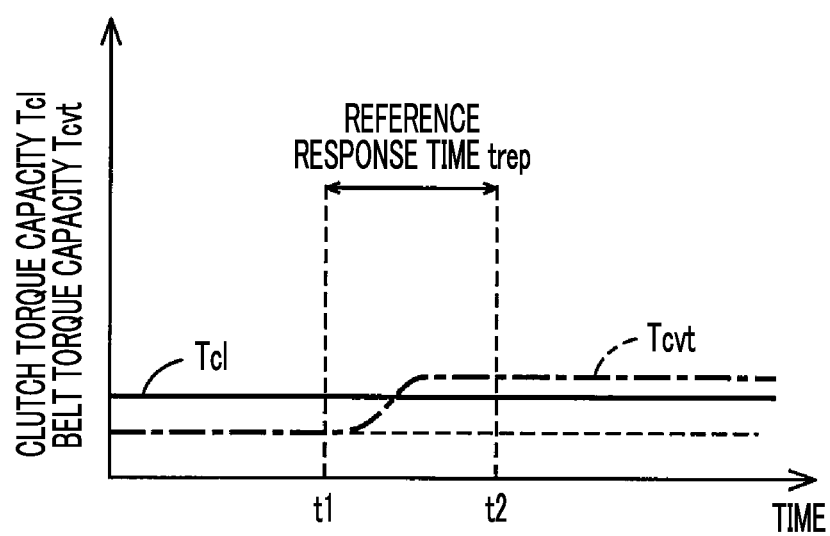
FIG. 8 is a view showing the response characteristics of a torque capacity of a clutch and a belt torque capacity of a continuously variable transmission at the time of a low oil temperature.

FIG. 8 shows response characteristics of the torque capacity Tcl of the clutch 18 and the belt torque capacity Tcvt of the continuously variable transmission 16 at the time when the oil temperature Toil is equal to or lower than the predetermined oil temperature Tα (when the oil temperature is low). When the oil temperature is low, the oil pressure Pcl of the hydraulic cylinder 18a of the clutch 18 is controlled in advance to the constant pressure Pcon, and the torque capacity Tcl also assumes a value smaller than when the oil temperature Toil is higher than the predetermined oil temperature Tα (when the oil temperature is high). At the time point t1, the belt torque capacity Tcvt is enhanced, and the torque capacity Tcl becomes smaller than the belt torque capacity Tcvt within the reference response time trep. This is because the torque capacity Tcl is held equal to a small value in advance due to the fact that the oil pressure Pcl of the hydraulic cylinder 18a of the clutch 18 is controlled in advance to the constant pressure Pcon.

Besides, in addition to the aforementioned control, when the oil temperature Toil becomes equal to or lower than the predetermined oil temperature Tα, the belt torque capacity Tcvt of the continuously variable transmission 16 may be enhanced to a predetermined torque capacity set in advance. In concrete terms, when the oil temperature Toil becomes equal to or lower than the predetermined oil temperature Tα, the belt torque capacity Tcvt of the continuously variable transmission 16 is controlled to a predetermined torque capacity that is larger than the belt torque capacity Tcvt that is set in the case where the oil temperature Toil is higher than the predetermined oil temperature Tα. The belt torque capacity Tcvt is thus enhanced in advance to the predetermined torque capacity, so the torque capacity Tcl can be more swiftly made smaller than the belt torque capacity Tcvt when a slip is detected. Incidentally, the predetermined torque capacity is also changed in accordance with the oil temperature Toil, and is preferably changed to a value that increases as the oil temperature Toil falls.

Figure 9:
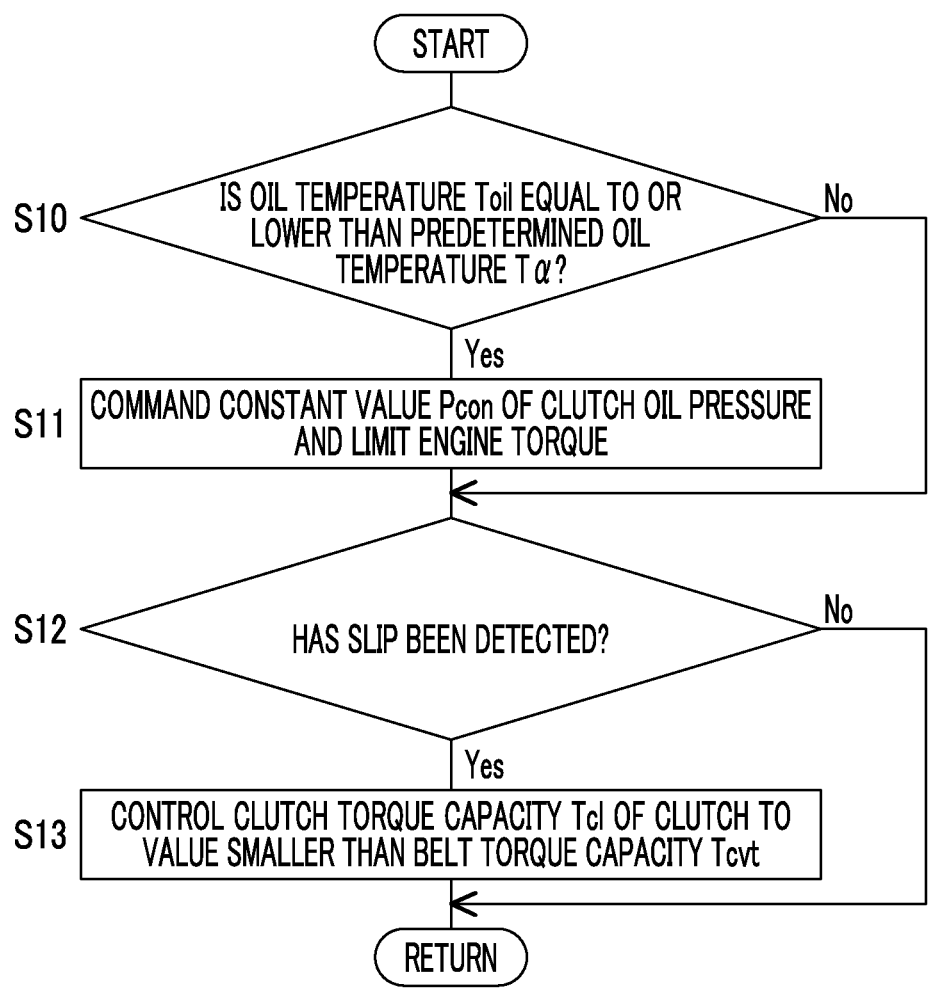
FIG. 9 is a flowchart illustrating a control operation that is performed by the electronic control unit of FIG. 7 to make it possible to restrain a belt of the continuously variable transmission from slipping even when an inertia torque is input from driving wheels due to a slip of a vehicle.

FIG. 9 is a flowchart illustrating a control operation that is performed by the electronic control unit 102 to make it possible to restrain the belt of the continuously variable transmission 16 from slipping even when an inertia torque is input from the driving wheels 24 due to a slip of the vehicle. This flowchart is repeatedly executed during the running of the vehicle.

First of all, in step S10 (the word "step" will be omitted hereinafter) corresponding to the function of the oil temperature determination unit 86, it is determined whether or not the oil temperature Toil of hydraulic oil is equal to or lower than the predetermined oil temperature Tα. If the oil temperature Toil is higher than the predetermined oil temperature Tα, the result of the determination in S10 is regarded as negative, and a transition to S12, which will be described later, is made. If the oil temperature Toil is equal to or lower than the predetermined oil temperature Tα, the result of the determination in S10 is regarded as positive, and a transition to S11 is made. In S11 corresponding to the clutch torque control unit 104 and the engine output control unit 106, the oil pressure Pcl of the hydraulic cylinder 18a of the clutch 18 is controlled to the constant pressure Pcon. At the same time, the upper limit Telim of the engine torque Te is set such that the clutch 18 does not slip during running.

Subsequently in S12 corresponding to the clutch torque control unit 104, it is determined whether or not a slip of the driving wheels 24 has been detected. If no slip has been detected, the result of the determination in S12 is regarded as negative, and the present routine is ended. If a slip has been detected, the result of the determination in S12 is regarded as positive, and a transition to S13 is made. In S13 corresponding to the continuously variable shift control unit 82 and the clutch torque control unit 104, the belt torque capacity Tcvt of the continuously variable transmission 16 is enhanced and controlled to a value larger than the torque capacity Tcl of the clutch 18.

It should be noted herein that if the oil temperature Toil is equal to or lower than the predetermined oil temperature Tα, the oil pressure Pcl of the hydraulic cylinder 18a of the clutch 18 is controlled to the constant pressure Pcon. Therefore, the torque capacity Tcl of the clutch 18 becomes small. When a slip is detected, the torque capacity Tcl becomes smaller than the belt torque capacity Tcvt within the reference response time trep. Accordingly, even when an inertia torque is input to the continuously variable transmission 16 due to sudden braking after the occurrence of a slip, the clutch 18 slips, and the belt of the continuously variable transmission 16 is restrained from slipping.

Figure 10:
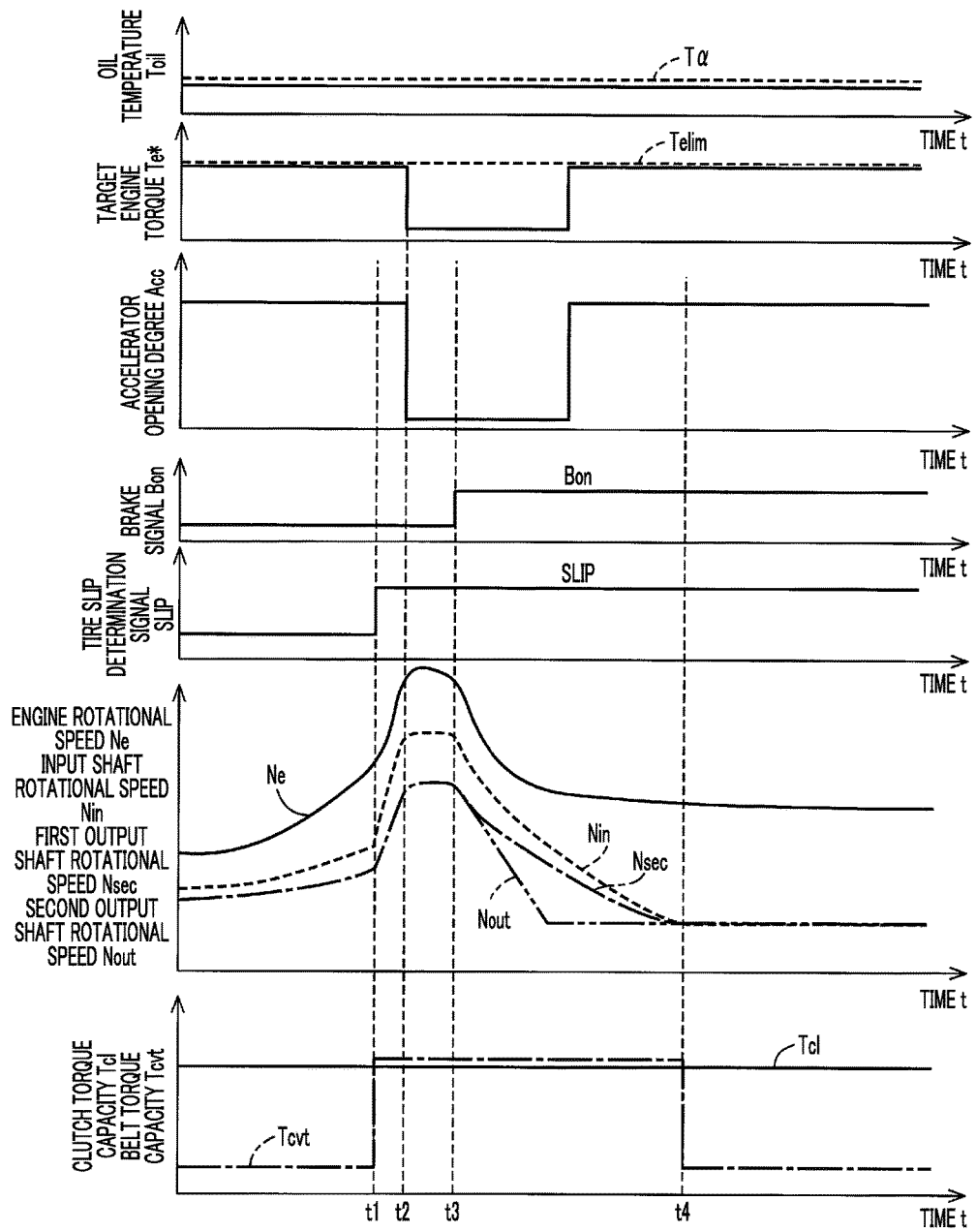
FIG. 10 is a time chart showing an operation result based on the flowchart of FIG. 9.

FIG. 10 is a time chart showing an operation result through the control operation of the electronic control unit 102. FIG. 10 shows the control operation while running with the oil temperature Toil of hydraulic oil being lower than the predetermined oil temperature Tα. In FIG. 10, the axis of abscissa represents the elapsed time t, and the axes of ordinate represent, sequentially from above, the oil temperature Toil, the target engine torque Te*, the accelerator opening degree Acc, the brake signal Bon, the tire slip determination signal SLIP, the various rotational speeds (the engine rotational speed Ne, the input shaft rotational speed Nin, the first output shaft rotational speed Nsec and the second output shaft rotational speed Nout) and the various torque capacities (the torque capacity Tcl and the belt torque capacity Tcvt) respectively.

As shown at the top of FIG. 10, the oil temperature Toil of hydraulic oil is lower than the predetermined oil temperature Tα at and before the time point t1. In this regard, as shown at the bottom of FIG. 10, the oil pressure Pcl of the hydraulic cylinder 18a of the clutch 18 is controlled to the constant pressure Pcon at and before the time point t1, so the torque capacity Tcl of the clutch 18 is held equal to a small value. Besides, the upper limit Telim of the target engine torque Te* is set such that the clutch 18 does not slip during running, so the target engine torque Te* is so regulated as to become equal to or smaller than the upper limit Telim.

When a slip is detected at the time point t1, the belt torque capacity Tcvt of the continuously variable transmission 16, which is indicated by an alternate long and short dash line, is enhanced to a predetermined value larger than the torque capacity Tcl. Incidentally, the belt torque capacity Tcvt shown in FIG. 10 is a command value, and the actual belt torque capacity Tcvt increases with delay. In concrete terms, the actual belt torque capacity Tcvt becomes equal to the predetermined value within the reference response time trep from the time point t1. This reference response time trep is set to a value shorter than a time interval between the time point t1 and the time point t3.

Depression of the accelerator pedal by the driver is cancelled at the time point t2, and the driver depresses the foot brake pedal at the time point t3, so an inertia torque resulting from a change in the rotational speed of the driving wheels 24 is input from the driving wheel 24 sides. At this time, the torque capacity Tcl is made in advance smaller than the belt torque capacity Tcvt. Therefore, even when an inertia torque is input at the time point t3, the clutch 18 slips, and the belt of the continuously variable transmission 16 is restrained from slipping.

As described above, according to the present embodiment of the present disclosure, when the oil temperature Toil of hydraulic oil is equal to or lower than the predetermined oil temperature Tα, the torque capacity Tcl of the clutch 18 is set to a value smaller than the torque capacity that is set in the case where the oil temperature Toil is higher than the predetermined oil temperature Tα. Thus, when a slip of the driving wheels 24 is detected, the torque capacity Tcl of the clutch 18 can be swiftly made smaller than the belt torque capacity Tcvt of the continuously variable transmission 16. Accordingly, even when an inertia torque is input from the driving wheel 24 sides, the clutch 18 slips, so the belt of the continuously variable transmission 16 is restrained from slipping.

Besides, according to the present embodiment of the present disclosure, the command oil pressure Pcl of the clutch 18 is set to the constant pressure Pcon lower than the command oil pressure that is set in the case where the oil temperature Toil of hydraulic oil is higher than the predetermined oil temperature Tα. Therefore, the torque capacity Tcl of the clutch 18 is smaller than a torque capacity at the time when the oil temperature Toil is higher than the predetermined oil temperature Tα. When a slip of the driving wheels 24 is detected, the torque capacity Tcl of the clutch 18 can be swiftly made smaller than the belt torque capacity Tcvt of the continuously variable transmission 16.

Besides, according to the present embodiment of the present disclosure, when the oil temperature Toil of hydraulic oil is equal to or lower than the predetermined oil temperature Tα, the belt torque capacity Tcvt of the continuously variable transmission 16 is controlled in advance to a value larger than in the case where the oil temperature Toil is higher than the predetermined oil temperature Tα. Thus, when a slip of the driving wheels 24 is detected, the torque capacity Tcl of the clutch 18 can be swiftly made smaller than the belt torque capacity Tcvt of the continuously variable transmission 16.

Besides, according to the present embodiment of the present disclosure, the torque capacity Tcl of the clutch 18 that is set in the case where the oil temperature Toil of hydraulic oil is equal to or lower than the predetermined oil temperature Tα is set to a value that can be made smaller than the belt torque capacity Tcvt of the continuously variable transmission 16 within the reference response time trep set in advance from detection of a slip of the driving wheels 24. Therefore, when a slip of the driving wheels 24 is detected, the torque capacity Tcl of the clutch 18 can be made smaller than the belt torque capacity Tcvt within the reference response time trep.

Besides, according to the present embodiment of the present disclosure, when a slip of the driving wheels 24 is detected, the belt torque capacity Tcvt of the continuously variable transmission 16 is enhanced to a value larger than the torque capacity Tcl of the clutch 18. Therefore, even when an excessive inertia torque is input from the driving wheel 24 sides, the clutch 18 slips, so the belt of the continuously variable transmission 16 is restrained from slipping.

Besides, according to the present embodiment of the present disclosure, while the torque capacity Tcl of the clutch 18 is controlled to a value smaller than a torque capacity at the time when the oil temperature Toil of hydraulic oil is higher than the predetermined oil temperature Tα, the engine torque Te is limited to such a range that the clutch 18 does not slip. Therefore, when the engine torque Te is transmitted to the clutch 18, the clutch 18 is restrained from slipping.

Although the embodiments of the present disclosure have been described above in detail based on the drawings, the present disclosure is also applicable to other aspects thereof.

For example, in each of the foregoing embodiments of the present disclosure, when the oil temperature Toil of hydraulic oil is equal to or lower than the predetermined oil temperature Tα, the lower limit γlow of the speed ratio γ of the continuously variable transmission 16 is set, or the oil pressure Pcl of the hydraulic cylinder 18a of the clutch 18 is controlled to the constant pressure Pcon. However, it is not indispensable to perform one of these two kinds of control. Both the kinds of control may be performed.

Besides, in each of the foregoing embodiments of the present disclosure, the vehicular drive unit 10 is configured to be equipped with the engine 12, the continuously variable transmission 16, and the clutch 18 that is provided between the continuously variable transmission 16 and the driving wheels 24. However, a gear mechanism may be further provided in parallel with the continuously variable transmission 16, and the power transmission path between the engine 12 and the driving wheels 24 may be changed over to either the continuously variable transmission 16 or the gear mechanism. At this time, the clutch 18 that is provided between the continuously variable transmission 16 and the driving wheels 24 can also be caused to function as a changeover clutch for changing over the power transmission path. Besides, a forward-backward changeover device that changes over the traveling direction of the vehicle may be provided between the torque converter 14 and the continuously variable transmission 16.

Besides, in each of the foregoing embodiments of the present disclosure, when the oil temperature Toil of hydraulic oil is equal to or lower than the predetermined oil temperature Tα, the oil pressure Pcl of the hydraulic cylinder 18a of the clutch 18 is controlled to the constant pressure Pcon, but is not necessarily limited to the constant pressure Pcon. The oil pressure may be further lowered when a slip is detected.

Incidentally, the foregoing is nothing more than the embodiments of the present disclosure. The present disclosure can be carried out in modes subjected to various alterations and improvements based on the knowledge of those skilled in the art.

What is claimed is:

1. A control apparatus for a vehicular drive unit, the vehicular drive unit including a power source, a continuously variable transmission, and a clutch, the continuously variable transmission being a belt-type continuously variable transmission, a power of the power source being input to the continuously variable transmission, and the clutch being arranged in a power transmission path between the continuously variable transmission and a driving wheel, the control apparatus comprising:
an electronic control unit configured to:
acquire an oil temperature of hydraulic oil; and
control the clutch such that, when the electronic control unit determines that the acquired oil temperature is equal to or lower than a predetermined threshold, a torque capacity of the clutch is set to a smaller value than a torque capacity that is set in a case where the electronic control unit determines that the acquired oil temperature of the hydraulic oil is higher than the predetermined threshold, wherein when the electronic control unit determines that the acquired oil temperature is equal to or lower than the predetermined threshold, the electronic control unit is configured to set a command oil pressure of the clutch to a smaller value than a command oil pressure that is set by the electronic control unit in a case where the electronic control unit determines that the acquired oil temperature of the hydraulic oil is higher than the predetermined threshold.

2. A control apparatus for a vehicular drive unit, the vehicular drive unit including a power source, a continuously variable transmission, and a clutch, the continuously variable transmission being a belt-type continuously variable transmission, a power of the power source being input to the continuously variable transmission, and the clutch being arranged in a power transmission path between the continuously variable transmission and a driving wheel, the control apparatus comprising:

an electronic control unit configured to:
acquire an oil temperature of hydraulic oil; and
control the clutch such that, when the electronic control unit determines that the acquired oil temperature is equal to or lower than a predetermined threshold, a torque capacity of the clutch is set to a smaller value than a torque capacity that is set in a case where the electronic control unit determines that the acquired oil temperature of the hydraulic oil is higher than the predetermined threshold, wherein
the electronic control unit is configured such that a value of the torque capacity of the clutch in a case where the acquired oil temperature is equal to or lower than the predetermined threshold is a value that can be made smaller than a belt torque capacity of the continuously variable transmission within a reference response time set in advance from detection of a slip of the driving wheel.

3. A control apparatus for a vehicular drive unit, the vehicular drive unit including a power source, a continuously variable transmission, and a clutch, the continuously variable transmission being a belt-type continuously variable transmission, a power of the power source being input to the continuously variable transmission, and the clutch being arranged in a power transmission path between the continuously variable transmission and a driving wheel, the control apparatus comprising:

an electronic control unit configured to:
acquire an oil temperature of hydraulic oil; and
control the clutch such that, when the electronic control unit determines that the acquired oil temperature is equal to or lower than a predetermined threshold, a torque capacity of the clutch is set to a smaller value than a torque capacity that is set in a case where the electronic control unit determines that the acquired oil temperature of the hydraulic oil is higher than the predetermined threshold, wherein
the electronic control unit is configured to control the continuously variable transmission in such a manner as to make a belt torque capacity of the continuously variable transmission larger than the torque capacity of the clutch when a slip of the driving wheel is detected.

4. A control apparatus for a vehicular drive unit, the vehicular drive unit including a power source, a continuously variable transmission, and a clutch, the continuously variable transmission being a belt-type continuously variable transmission, a power of the power source being input to the continuously variable transmission, and the clutch being arranged in a power transmission path between the continuously variable transmission and a driving wheel, the control apparatus comprising:

an electronic control unit configured to:
acquire an oil temperature of hydraulic oil; and
control the clutch such that, when the electronic control unit determines that the acquired oil temperature is equal to or lower than a predetermined threshold, a torque capacity of the clutch is set to a smaller value than a torque capacity that is set in a case where the electronic control unit determines that the acquired oil temperature of the hydraulic oil is higher than the predetermined threshold, wherein
the electronic control unit is configured to control the power source such that a torque of the power source is limited to a torque within such a range as not to cause the clutch to slip at a time of transmission of the torque to the clutch, when the torque capacity of the clutch becomes smaller than a torque capacity at a time when the acquired oil temperature is higher than the predetermined threshold.

* * * * *